United States Patent Office 2,984,351
Patented May 16, 1961

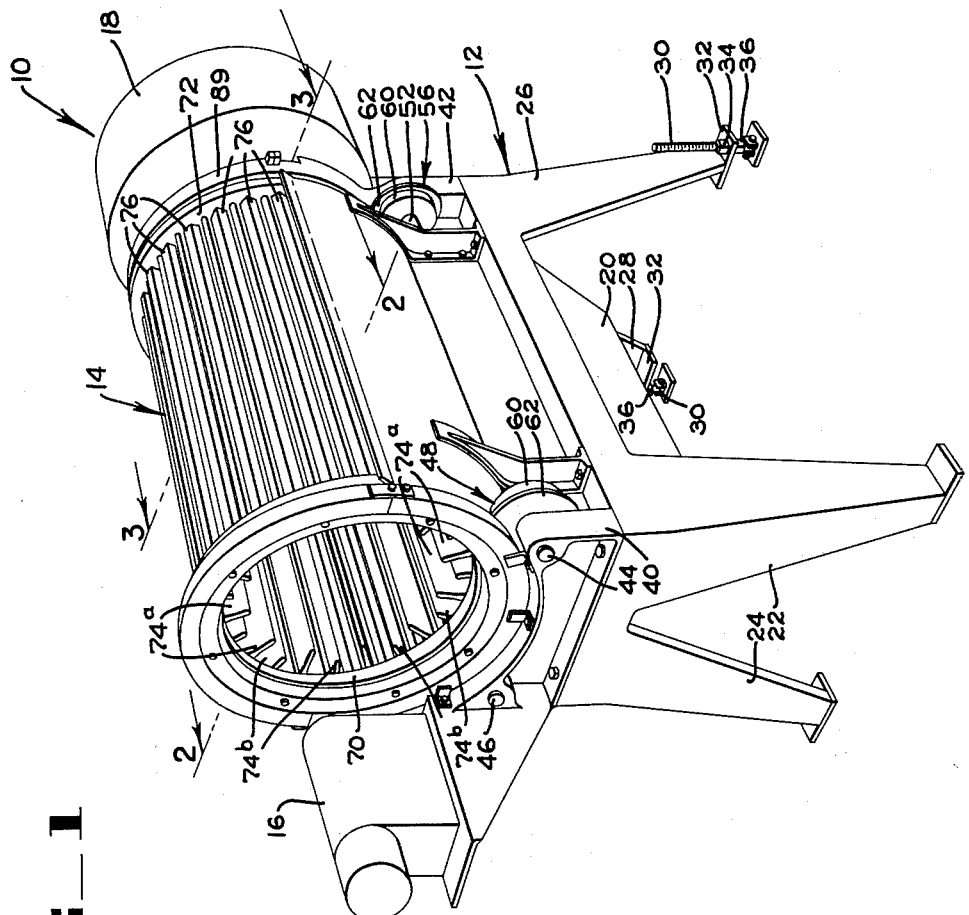
FIG_1

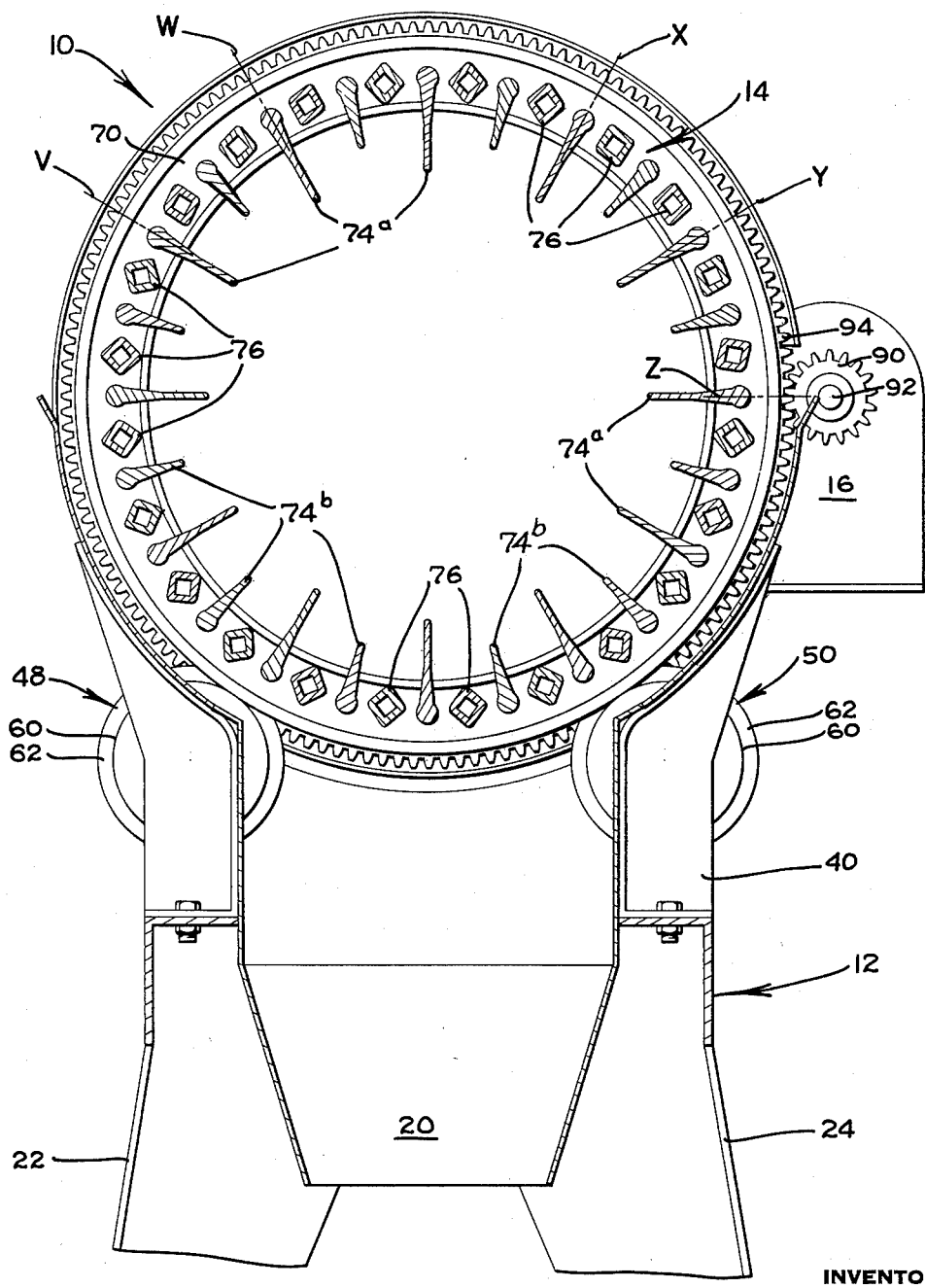

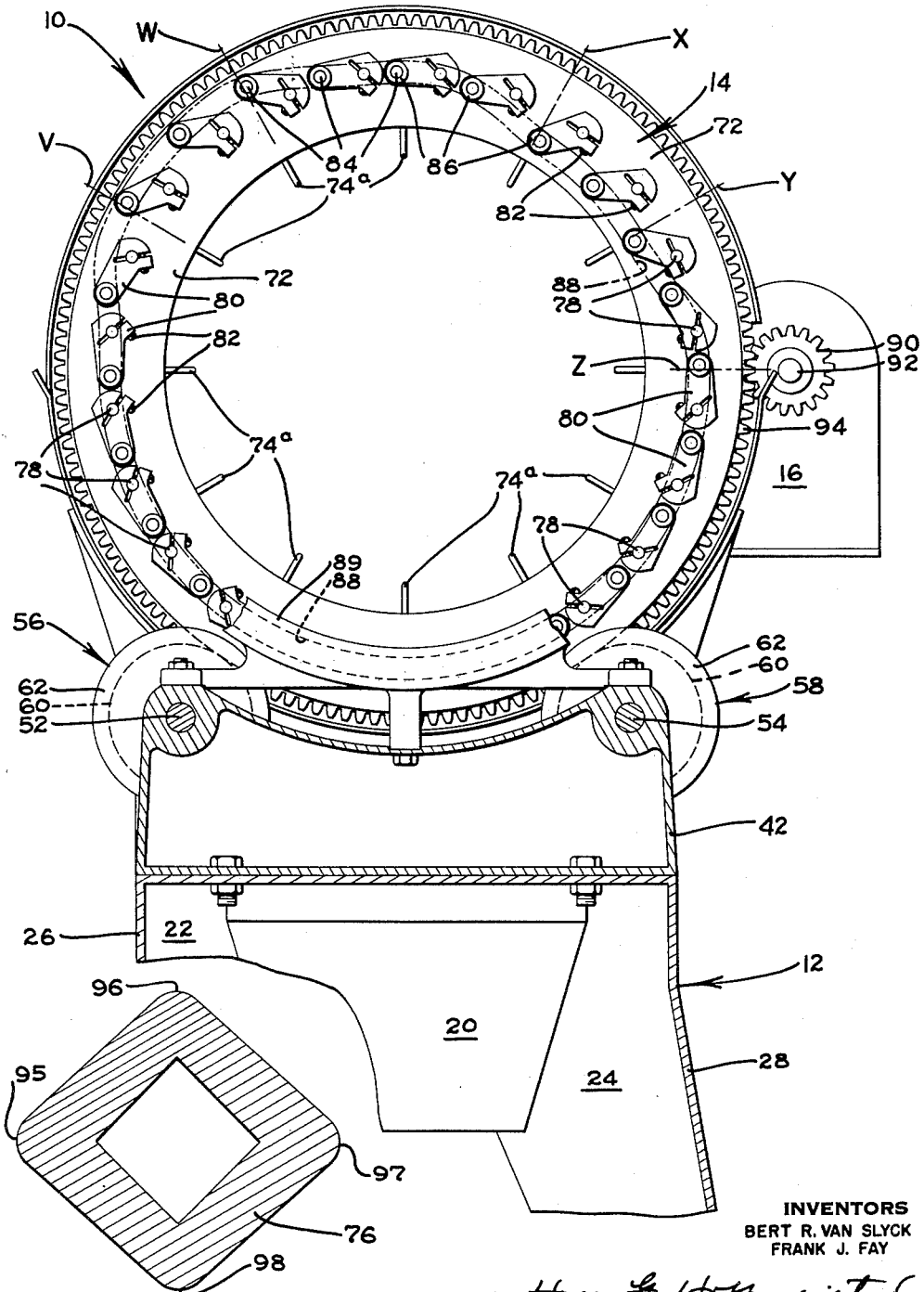

2,984,351

HORIZONTAL REEL TYPE BEAN SIZER

Bert R. Van Slyck, Oswego, Oreg., and Frank J. Fay, San Carlos, Calif., assignors to Food Machinery and Chemical Corporation, San Jose, Calif., a corporation of Delaware Filed Jan. 15, 1958, Ser. No. 709,057

3 Claims. (Cl. 209—98)

The present invention pertains to sizing apparatus and more particularly relates to a machine for sizing vegetables such as whole green beans.

One type of whole green bean sizer often used in canneries comprises a machine adapted to receive a random mass of beans and to size these beans according to their largest transverse dimension. This sizing operation is performed in order to make more efficient subsequent use of cutting machines which snip off the ends of the beans, as well as to obtain uniformity of pack in the canned product. It is this type of sizer to which the present invention relates.

It is an object of the present invention to provide an improved whole green bean sizer adapted to sort green beans into two size grades, that is, to separate the beans whose transverse dimension exceeds a certain minimum from those having a smaller transverse dimension.

Another object is to provide a green bean sizer which mechanically releases beans which become temporarily jammed in the sizing apertures and allows them to again be subjected to the sizing operation.

These and other objects and advantages of the present invention will become apparent from the following specification in conjunction with the accompanying drawings, in which:

Fig. 1 is a perspective illustrating an overall view of the machine of the present invention with its guard removed.

Fig. 2 is a vertical transverse section taken on line 2—2 of Fig. 1.

Fig. 3 is a vertical section, with parts broken away, taken on line 3—3 of Fig. 1.

Fig. 4 is an enlarged transverse section through one of the sizing bars.

Referring now to the drawings, the reference numeral 10 generally indicates the machine of the present invention which comprises a frame 12 rotatably supporting a bean sizing reel 14 driven by a motor 16. A feed hopper 18 is secured to one end of the reel 14 and rotates therewith. A discharge hopper 20 is mounted below the reel 14, and a removable discharge chute (not shown) may be mounted adjacent the end of the reel 14 opposite from the feed hopper 18.

The frame 12 is rectangular and is provided with four legs 22, 24, 26 and 28. The legs 26 and 28, adjacent the feed side of the machine, are provided with elevating screws 30 which extend through suitable openings in horizontal flanges 32 at the bottom of the legs 26 and 28. Nuts 34 and 36 are disposed on each screw, one above and one below each of said flanges. The elevating screws 30 are provided so that the feed end of the reel 14 may be elevated with respect to the discharge end thereof so that the beans will gravitate therethrough as the reel is rotated.

Two brackets 40 and 42 are mounted on the frame 12 one adjacent each end thereof. The bracket 40 carries two stub shafts 44 and 46 (Fig. 1) on which two flanged reel supporting rollers 48 and 50 are rotatably mounted. Similarly, the bracket 42 carries two stub shafts 52 and 54 (Fig. 3) on which two flanged reel supporting rollers 56 and 58 are rotatably mounted. The four rollers 48, 50, 56 and 58 are all identical and each comprises a peripheral reel supporting surface 60 and a radially extending annular flange 62. The rollers 56 and 58 are mounted so that the flanges 62 thereof are oppositely disposed from the flanges 62 of the rollers 48 and 50.

The reel 14 comprises two end rings 70 (Fig. 2) and 72 (Fig. 3). The ring 70 rests on the support surfaces 60 of the rollers 48 and 50 with the flanges 62 of the rollers extending alongside the outer end of the ring. Similarly, the ring 72 rests on the rollers 56 and 58, with the flanges 62 extending alongside the outer end face of the ring.

The rings 70 and 72 are connected together by a plurality of radially disposed paddles 74a and 74b (Fig. 2) fixed to said rings in any suitable manner. The paddles are of two types, the relatively wide paddles 74a and the relatively narrow paddles 74b alternately spaced at equal points around the rings 70 and 72. Since adjacent paddles have different widths, they will project upwardly to different heights when they are moving through the sizing zone immediately above hopper 20 (Fig. 2). Accordingly, there is no possibility that the beans will lay across two adjacent paddles and pile up in this zone. The radially outer ends of each of the paddles are located on a circle which is concentric with the rings 70 and 72. The outer ends of said paddles are each of the same thickness regardless of the width thereof, and each of the paddles tapers inwardly from said outer ends.

A plurality of diamond-shaped bean sizing tubes or bars 76 (Fig. 2) are rotatably mounted between the rings, one tube being mounted longitudinally of the reel between each two adjacent paddles adjacent the periphery of the rings. The tubes 76 are all mounted on a common circle which is concentric with the rings 70 and 72 and interposed between the paddles. As seen in Figs. 2 and 4, the tubes 76 are diamond-shaped in cross section. The ends of the tubes 76 are provided with cylindrical extensions, as indicated at 78 (Fig. 3), which extend through and are rotatably supported in suitable openings in the rings 70 and 72, whereby each tube 76 may be rotated about its own axis.

Referring now to Fig. 3, the extensions 78 of the tubes 76 which project through the ring 72 nearest the feed end of the reel 14 are each provided with a cam follower arm 80 having a split hub portion clamped to the extension 78 by a screw 82. Each of the arms 80 carries a stub shaft 84 on which a cam follower roller 86 is rotatably mounted. The cam follower rollers 86 are all confined within a cam groove 88 formed in a cam ring 89 fixedly mounted to the bracket 42 and extending between the outer surface of the ring 72 and the feed hopper 18. The path of the cam groove is indicated in phantom lines at 88 in Fig. 3.

By studying Figs. 2 and 3 in conjunction with each other it may be seen that the cam groove 88 is so designed that, at the lower portion of the reel, the tubes 76 are each disposed so that opposite corners thereof are disposed in facing relation to the adjacent paddles 74 thus defining a minimum size opening therebetween through which beans of a predetermined transverse dimension may fall into the hopper 20 beneath the reel 14, while beans having a transverse dimension greater than the spacing between the corners of the tubes 76 and the adjacent paddles are retained within the reel 14. It will also be noted from Fig. 4, that the tubes 76 are diamond-shaped and that the distance between one set of opposed corners 95 and 97 is slightly different from the distance between the other set of opposed corners 96 and 98 whereby loosening of the split hub portion of the cam follower arm 80 and rotation of the tubes 76 through 90° will effect a change in the bean sizing openings, thus permitting two different size grading operations with one set of sizing tubes.

As the reel 14 rotates clockwise as viewed in Figs. 2 and 3, and the tubes 76 reach a position indicated approximately at V (Figs. 2 and 3) the cam grooves 88 acts on the follower rollers 86 to rotate the tubes 76 clockwise about their own axis so that one set of opposing flat surfaces thereof are now disposed substantially parallel to and in opposing relation to the adjacent paddles 74, whereby the space between the tubes 76 and the adjacent paddles 74 is increased thus releasing any beans jammed therebetween and permitting them to fall back into the reel 14. At position W the action of the cam groove 88 commences to rotate the tubes 76 counterclockwise a full ¼ turn through their center position until at position X the other set of opposed flat surfaces are disposed substantially parallel to the paddles 74. At the Y position the cam groove 88 again causes clockwise rotation for ⅛ turn to again dispose the tubes 76 with opposed corners facing the adjacent paddles 74 when the Z position is reached. The bars retain this orientation until the V position is again reached.

Rotation of the reel 14 is effected by a pinion 90 mounted on a shaft 92 of the motor 16 and meshing with a large ring gear 94 fixed to the ring 70 of the reel 14.

In the operation of the device beans to be sized are dumped into the feed hopper 18 either in batches or by means of a continuous conveyor, not shown. They are then fed into the reel 14 and tumbled therein by the action of the paddles 74a and 74b, each of the beans in the mass will eventually align itself with one of the elongated openings between the tubes 76 and the paddles 74 and, if it is smaller in lateral dimension than the width of said opening the bean will fall through into the hopper 20. Beans of greater lateral dimension than said openings will be returned to the mass of beans gravitating through the reel 14, and eventually be discharged from the other end thereof into a chute (not shown). In this manner beans fed into the reel 14 are separated into two groups, those having a cross-sectional dimension greater than a predetermined value and those having a dimension less than said value.

While a preferred form of the invention has been shown and described herein, it should be noted that various changes may be made therein without departing from the spirit of the invention as defined in the appended claims.

Having thus described the invention what we claim as new and desire to protect by Letters Patent is:

1. In a bean sizer, a rotatably mounted reel comprising a pair of spaced rotatable mounting members, a plurality of spaced guide vanes fastened between said members in a circular pattern to define a cylindrical enclosure, a substantially diamond shaped grading bar adjustably secured between said mounting members at the periphery of said enclosure and between each adjacent pair of guide vanes, said vanes having a radial length substantially greater than the radial length of said bars to extend radially inwardly from said periphery of said enclosure to guide beans to the openings between said grading bars and said vanes, the diamond shape of said bar providing a major and a minor axis with the two pairs of opposed corners of the diamond defining the extent of said axes whereby when a diamond shaped bar is positioned between two vanes with the major axis disposed in a plane normal to a radius of said cylindrical enclosure, a first pair of equal size grading openings will be defined between the bar and the vanes and, when the minor axis is disposed in said plane, a second pair of equal size grading openings will be defined that are different in size from the first pair of grading openings; and means for rotating said reel.

2. In a bean sizer, a rotatable reel comprising a pair of end rings, a plurality of spaced guide vanes secured between said end rings in a circular pattern to define a cylindrical enclosure, said vanes extending a substantial distance inwardly, a grading bar adjustably secured between said end rings and between each adjacent pair of guide vanes, said bar having a transverse cross-section with a major and a minor axis and having pairs of opposed corners, one pair of corners being disposed on each axis and defining the length thereof, whereby when said bar is positioned between two vanes with the major axis disposed in a plane normal to a radius of said cylindrical enclosure a first pair of equal size grading openings will be defined between the bar and the vanes and, when the minor axis is disposed in said plane, a second pair of equal size grading openings will be defined that are different from the first pair of grading openings, all of said vanes being positioned to project inwardly from the periphery of said enclosure past the inner edges of said grading bars to provide flat side surfaces for carrying beans upwardly during rotation of said reel and releasing them at an elevated position to cascade downwardly toward the guide vanes then at the lower part of the enclosure, alternate ones of said guide vanes being elongated so that they project inwardly toward the axis of said enclosure a greater distance than the remainder of said vanes, whereby the inner ends of said alternate vanes provide a fulcrum around which beans cascading downwardly will be pivoted and directed to said grading openings, the inner end of each alternate vane also cooperating with the inner end of an adjacent shorter vane to define a downwardly directed slanted guide surface for guiding beans to a particular one of said grading openings.

3. In a bean sizer, a rotatably mounted reel comprising a pair of spaced rotatable mounting members, a plurality of spaced guide vanes fastened between said members in a circular pattern to define a cylindrical enclosure, a substantially diamond shaped grading bar adjustably secured between said mounting members at the periphery of said enclosure between each adjacent pair of guide vanes, said vanes having a radial length substantially greater than the radial length of said bars to extend radially inwardly from said periphery of said enclosure to guide beans to the openings between said grading bars and said vanes, the diamond shape of said bar providing a major and a minor axis with the two pairs of opposed corners of the diamond defining the extent of said axes whereby when said diamond shaped bar is positioned between two vanes with the major axis disposed in a plane normal to a radius of said cylindrical enclosure, a first pair of equal size grading openings will be defined between the bar and the vanes and, when the minor axis is disposed in said plane, a second pair of equal size grading openings will be defined that are different in size from the first pair of grading openings, alternate ones of said guide vanes being elongated so that they project inwardly toward the axis of said enclosure a greater distance than the remainder of said vanes, whereby the inner ends of said alternate vanes provide a fulcrum around which beans cascading downwardly will be pivoted and directed to said grading openings, the inner end of each alternate vane also cooperating with the inner end of an adjacent shorter vane to define a downwardly directed slanted guide surface for guiding beans to a particular one of said grading openings, and means for rotating said reel.

References Cited in the file of this patent

UNITED STATES PATENTS 18,687    Gass                   Nov. 24, 1857

(Other references on following page)

UNITED STATES PATENTS

| | | |
|---|---|---|
| 395,621 | Harrell | Jan. 1, 1889 |
| 1,610,350 | Anderson et al. | Dec. 14, 1926 |
| 1,874,391 | Urschel | Aug. 30, 1932 |
| 2,241,977 | Buck | May 13, 1941 |
| 2,533,357 | Crawford | Dec. 12, 1950 |
| 2,687,801 | Jackson | Aug. 31, 1954 |

FOREIGN PATENTS

| | | |
|---|---|---|
| 16,837 | Norway | Oct. 7, 1907 |
| 371,834 | Germany | Mar. 22, 1923 |
| 856,905 | France | Apr. 1, 1940 |
| 957,651 | Germany | Feb. 7, 1957 |
| 1,085,675 | France | July 28, 1954 |